No. 774,633. PATENTED NOV. 8, 1904.
H. ACKERMAN.
COUPLING FOR GAS HOSE.
APPLICATION FILED FEB. 19, 1904.
NO MODEL.
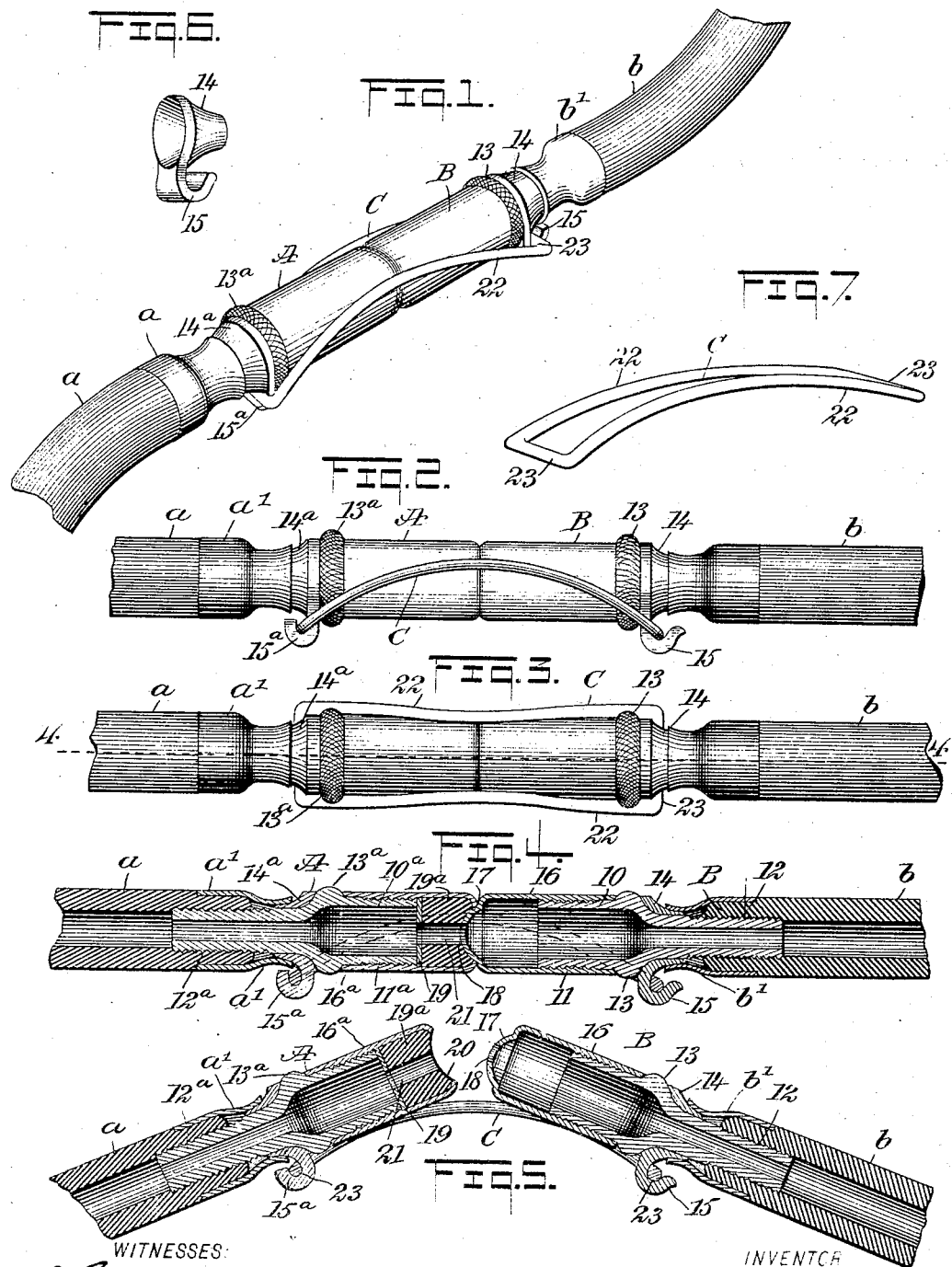
WITNESSES:
INVENTOR
Henry Ackerman
BY
ATTORNEYS No. 774,633.

Patented November 8, 1904.

UNITED STATES PATENT OFFICE.

HENRY ACKERMAN, OF NEWARK, NEW JERSEY.

COUPLING FOR GAS-HOSE.

SPECIFICATION forming part of Letters Patent No. 774,633, dated November 8, 1904.

Application filed February 19, 1904. Serial No. 194,424. (No model.)

*To all whom it may concern:*

Be it known that I, HENRY ACKERMAN, a citizen of the United States, and a resident of Newark, in the county of Essex and State of New Jersey, have invented a new and Improved Coupling for Gas-Hose, of which the following is a full, clear, and exact description.

The purpose of my invention is to provide a coupling for hose, especially gas-hose, and to so construct the coupling that it will be simple, easily operated, and may be instantly parted and as quickly united in a gas-tight manner.

The main purpose of the invention is to provide a coupling especially adapted for use in connection with gas-hose adapted to connect a standing burner or drop-light with a source of gas-supply, the connection being so made that when the said standing burner is to be disconnected from the fixture and moved from place to place but a short length of tubing will be connected with the burner and the matting length of tubing need not be removed from the source of supply with which it is connected.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a perspective view of the improved coupling in coupled position and an attached section of hose. Fig. 2 is a side elevation of the parts shown in Fig. 1. Fig. 3 is a plan view of the parts shown in Figs. 1 and 2. Fig. 4 is a longitudinal section taken practically on the line 4 4 of Fig. 3. Fig. 5 is a longitudinal section taken also on the line 4 4 of Fig. 3, but illustrating the coupling in uncoupled position. Fig. 6 is a detail perspective view of one of the keepers for the clamp of the coupling, and Fig. 7 is a detail perspective view of the coupling-clamp.

The coupling consists of two sections— namely, a female section A and a male section B. The female section A is connected with a line of hose $a$ of any suitable length, and a line of hose $b$ is likewise connected with the male section B.

The male section B of the coupling consists of a tubular body 10, provided with an exterior thread 11 and a tubular shank 12 of reduced diameter integral with or attached to the body, the outer surface of which shank is exteriorly threaded or roughened to receive the section $b$ of the hose. Where the body and the shank members of the said male section B connect, the outer face of the shank is more or less curved or inclined in direction of the body 10, and at the exterior of the body 10, where it connects with the shank 12, an exterior usually milled annular finger-rib 13 is produced, so that the body may be firmly gripped and held while a cap member 16 is screwed upon or unscrewed from the body 10. A keeper is loosely slipped over the shank 12, which keeper consists of a sleeve 14, fitted to the above-mentioned curved or inclined exterior face of the shank 12, and an outwardly-facing hook 15 at the lower or under portion of the sleeve, and where the inner end of the hose-section $b$ is slipped over the shank 12 of the male section of the coupling B a ferrule $b'$ is provided, which is adapted to the exterior of the sleeve member 14 of the keeper above referred to, which keeper is illustrated in detail in Fig. 6 and applied in Figs. 2, 3, 4, and 5. The cap member 16 of the male section B of the coupling is screwed upon the outer threaded face of the body 10 and extends beyond the outer end of the said body a predetermined distance, as is shown in Figs. 4 and 5, and the outer member 17 of the cap member 16 is convexed and provided with an aperture 18 about centrally located.

With reference to the female section A of the coupling it is of the same construction as the male section B, with the exception of the construction of the outer end portion of the cap member, (designated as $16^a$.) In addition to the cap member $16^a$ the female section A of the coupling consists of a body $10^a$, having an exterior thread $11^a$ and a shank $12^a$, the body and shank corresponding to the body 10 and shank 12 of the male section of the coupling, and the said body-section $10^a$ of the female section of the coupling is provided with an exterior ribbed or serrated annular finger-piece 13ª, corresponding to the rib 13 of the male section B of the coupling. The shank of the female section of the coupling where it connects with the body 10ª is provided with an exterior curved surface corresponding to the curved surface on the shank of the male section of the coupling where the shank and body of said section connect. At the said curved surface of the female section A a keeper is fitted corresponding to the keeper located on the shank of the male section B. The sleeve of the keeper of the female section of the coupling is designated as 14ª, and the hook is designated as 15ª, the hook 15ª being outwardly bent or carried in a direction opposite to the corresponding hook 15 of the male section B, and where the section of hose $a$ connects with the shank 12ª of the female section of the coupling a ferrule $a'$ is located, fitted to the outer face of the sleeve 14ª of the keeper for the said female section.

With reference to the construction of the cap member 16ª of the female section of the coupling a washer 19, having a central opening therein, is made to fit snugly within the said cap member and against the outer end of the body 10ª of the said body-section A of the coupling, as is shown in Figs. 4 and 5. The outer end of the cap member 16ª is open, but is provided with an inwardly-curved marginal flange, as is shown in Figs. 4 and 5, and between this flange and the washer 19 a rubber cushion 19ª is located, having a central bore which registers with the aperture in the washer 19. The forward or outer end of the said cushion 19ª is more or less concaved, so that when the two sections of the coupling are brought together the cushion 19ª of the female section of the coupling will snugly receive the outer convexed portion 17 of the male section of the coupling, and thus produce an air-tight and a gas-tight joint. When the sections of the coupling are thus brought together, the aperture 18 in the outer end of the cap member 16 of the male section of the coupling will be in registry or direct communication with the bore in the cushion 19ª and the opening in the washer 19, as is shown in Fig. 4. Therefore the forward or outer end of the cushion 19ª is concaved, as is shown at 20 in Fig. 5, and the bore above referred to in the said cushion 19ª is designated in the drawings as 21.

The two sections A and B of the coupling are held together by means of a clamp C. This clamp is more or less curved and consists of two side members 22, correspondingly curved and connecting end members 23. The space between the side members 22 of the clamp C is just sufficient to receive the cap members 16 and 16ª of the sections of the coupling, as is shown in Figs. 1, 2, and 3, and the said clamp C is shown in detail in Fig. 7.

In the operation of the coupling, before the two sections A and B are brought together, the parts being in the position shown in Fig. 5, the ends of the clamp C are made to engage with the hook members of the keepers above referred to, and then the two sections of the coupling are brought from their inclined position relative to each other to an abutting horizontal position. (Shown in Figs. 1, 2, 3, and 4.) The outer end of the cap member 16 of the male section B thus enters the concaved portion 20 at the corresponding end of the cap member 16ª of the female coupling, and when these two sections of the coupling are thus brought together the clamp C, which is of spring material, is made to bow upward and hold the engaging sections of the couplings in their abutting position, rendering the coupling as gas and air tight where its sections abut as at any point in the unbroken portion of the hose connected with the sections. The section of hose $a$, for example, need be but a short section, and this section is adapted to the gas-receiving portion of the standing burner or drop-light to which the hose is to be applied, while the section $b$ of the hose, which may be of any desired length, can be provided with the usual gooseneck to pass over the burner of a chandelier or can be tipped to receive the fluted projection from the ordinary gas-cock.

Ordinarily when it is desirable to move a standing burner or drop-light from one place to another it is necessary to remove the gooseneck from the fixture to which it is applied and wrap the entire length of hose around said standing burner, which is very inconvenient and frequently injures the hose, whereas by means of this coupling when a standing burner or drop-light is to be moved, for example, to another room it is simply necessary to force the two sections of coupling apart, as is shown in Fig. 6, which is readily accomplished by gentle pressure on the end under portions of the sections, and then the clamp C can be removed, leaving only a short section of hose, carrying, for example, the female section of the coupling attached to the standing burner or drop-light, and then the other section, $b$, of the hose may be coiled up around the burner or other source of gas-supply with which it is connected, so as to be always in position for service when required.

Having thus described my invention, I claim as new and desire to secure by Letters Patent—

1. A hose-coupling, consisting of male and female sections arranged for interlocking engagement, keepers carried by the said sections, and an arched spring-clamp arranged for engagement with the keepers and adapted to partially embrace the sections of the coupling.

2. A coupling for gas-hose, comprising interlocking male and female sections, keepers carried by the said sections, having members oppositely directed, and an arched spring-clamp comprising side and end members, the end members of which clamp are received by the oppositely-disposed members of the keepers, the said members of the clamps being adapted to extend along opposite sides of the sections of the coupling, as set forth.

3. A coupling for gas-hose, consisting of a male and a female section, the male section having an apertured convexed outer end and the female section an apertured and concaved cushioned outer end, a keeper for each section of the coupling, each keeper having a hook member, the said hook members extending in opposite directions, and an arched-bow spring-clamp adapted for engagement with the hook members of the keepers of the sections, as described.

4. In couplings for gas-hose, male and female sections, the male section comprising a tubular shank fitted to receive a section of hose, an exteriorly-threaded tubular body member, and a cap member screwed on the body member and provided with an apertured convexed outer end, the female section of the coupling consisting of a tubular shank member and a tubular exteriorly-threaded body member and a cap member screwed on the body member, the cap member being open at its outer end, an apertured cushion located at the open end of the cap member, having its outer end concaved, and an apertured support for the inner end of the said cushion, a keeper located on the shank member of each section of the coupling, each member being provided with a hook, the hooks of the two members being curved in opposite directions, and an arched-yoke spring-clamp adapted to be engaged at its ends by the hooks of the said keepers and to receive between its side members the cap members of the sections of the coupling, as described.

In testimony whereof I have signed my name to this specification in the presence of two subscribing witnesses.

HENRY ACKERMAN.

Witnesses:
J. FRED. ACKER,
JNO. M. RITTER.